United States Patent [19]

Weissfloch

[11] Patent Number: 5,326,249
[45] Date of Patent: Jul. 5, 1994

[54] APPARATUS FOR BENDING LAMELLAR WORKPIECES

[75] Inventor: Reinhard Weissfloch, Stolberg-Breinig, Fed. Rep. of Germany

[73] Assignee: Wegener GmbH, Aachen, Fed. Rep. of Germany

[21] Appl. No.: 140,987

[22] Filed: Oct. 25, 1993

Related U.S. Application Data

[63] Continuation of Ser. No. 68,307, May 28, 1993, abandoned, which is a continuation of Ser. No. 698,124, May 10, 1991, abandoned.

[30] Foreign Application Priority Data

May 10, 1990 [DE] Fed. Rep. of Germany ....... 4014994

[51] Int. Cl.⁵ .............................................. B29C 53/00
[52] U.S. Cl. ..................................... 425/383; 72/389; 156/443; 264/295; 264/339; 425/394
[58] Field of Search ................. 72/383, 386, 387, 389, 72/420; 156/443, 581; 264/295, 339; 425/383, 394

[56] References Cited

U.S. PATENT DOCUMENTS

| Re. 21,479 | 6/1940 | Trabucco | 425/394 |
|---|---|---|---|
| 818,932 | 4/1906 | Baxter | 72/383 |
| 2,892,217 | 6/1959 | Luboshez | 264/339 |
| 3,767,752 | 10/1973 | Karlyn et al. | 264/339 |
| 3,822,160 | 7/1974 | LaBarge et al. | 156/304.2 |
| 4,002,417 | 1/1977 | Vecchiotti et al. | 264/339 |
| 4,153,665 | 5/1979 | Vecchiotti et al. | 264/295 |
| 4,465,453 | 8/1984 | Turner et al. | 264/339 |
| 4,470,795 | 9/1984 | Prusak | 264/339 |
| 4,594,870 | 6/1986 | Koyama et al. | 72/389 |
| 4,720,255 | 1/1988 | Mittelstadt | 425/394 |
| 4,753,100 | 6/1988 | He,uml/a/ nni | 72/389 |
| 5,020,985 | 6/1991 | Torres | 264/339 |
| 5,112,210 | 5/1992 | Weissfloch | 425/383 |

FOREIGN PATENT DOCUMENTS

| 1838904 | 8/1961 | Fed. Rep. of Germany . |
|---|---|---|
| 1962441 | 7/1970 | Fed. Rep. of Germany . |
| 2441181 | 3/1976 | Fed. Rep. of Germany . |
| 8536431 | 6/1985 | Fed. Rep. of Germany . |
| 8536431 | 6/1986 | Fed. Rep. of Germany . |
| 3637436 | 4/1988 | Fed. Rep. of Germany . |
| 1187932 | 9/1959 | France . |
| 124961 | 12/1974 | German Democratic Rep. . |
| 60-36134 | 2/1985 | Japan . |
| 63-109039 | 5/1988 | Japan . |
| 8801940 | 8/1988 | Netherlands . |

OTHER PUBLICATIONS

H. Reinsch, Spanloses Umformen von Platten, Folien und Profilen aus Kunststoff, 1967, pp. 50–52, 54.

Primary Examiner—David A. Simmons
Assistant Examiner—William J. Matney, Jr.
Attorney, Agent, or Firm—Joseph W. Berenato, III

[57] ABSTRACT

A machine for bending reinforced thermoplastic workpieces includes a machine frame. First and second spaced rest plates are mounted to the frame, with the plates having a first planer orientation, which define a rest plane, for supporting a workpiece and a second angularly disposed orientation for bending the workpiece. A compression rest is disposed between the plates. A heated bending beam is in alignment with and spaced from the compression rest. A drive system is operably associated with the frame for causing relative movement between the beam and the plates and the rest, so that a workpiece supported by the plates and the rest in the first orientation may engage the beam. The plates are operably interconnected for therefore defining a common pivot axis. A system is provided for causing at least one of the plates to be pivoted about the pivot axis. A further system is operably associated with the plates when in the first planer orientation for adjusting the plates relative to the common pivot axis so that the rest plane may be selectively positioned relative to the common pivot axis prior to a workpiece on said plates being engaged by the bending beam.

20 Claims, 4 Drawing Sheets

APPARATUS FOR BENDING LAMELLAR WORKPIECES

This is a continuation of co-pending application Ser. No. 08/068,307, filed on May 28, 1993, now abandoned, which is a continuation of application Ser. No. 07/698,124, filed on May 10, 1991, now abandoned.

FIELD OF THE INVENTION

The invention concerns a method for bending lamellar workpieces made of a thermoplastic composite material, namely a fiber-reinforced thermoplastic or a thermoplastic sandwich material, whereby the workpiece is heated at least to plasticization in the area of the bending zone and then is bent. Moreover the invention concerns equipment with which to implement this method.

BACKGROUND OF THE INVENTION

Bending equipment is known for bending lamellar, thermoplastic workpieces which comprise at the center of the machine frame a stationary clamping means followed—as seen in the direction of advance of the workpiece—by a pivotably suspended, strip-like bending cheek. A heater and a holder are mounted behind the clamping means on a frame displaceable in and opposite the direction of advance. The heater consists of two superposed heater blades behind which is mounted the holder, which assumes the form of a clamping strip. A stop strip is present on the other side of the bending cheek and rests displaceable on two side rails.

To carry out bending, first the stop strip and the frame with the heater and holder are arranged symmetrically to the front edge of the bending cheek and locked in place. Thereupon the workpiece is inserted in such a way that it comes to rest between the clamping strips of the holder and the two heater blades. At its front edge the workpiece abuts the pertinent zone of the bending cheek. Thereupon the two heater blades are so moved together that they shall rest against both sides of the workpiece which they heat while forming a bending zone, whereby the workpiece is plastically deformable in the bending zone. The workpiece in this process is held in place both by the clamping means and the holder.

Once the bending zone has been sufficiently heated, the clamping means and the holder are deactivated, that is, the workpiece is released. Then it is manually moved forward toward the stop strip until it comes to rest against it. Thereupon the clamping strip is reactivated, that is, the workpiece is braced broadside in front of the bending cheek and clamped in place. Next the bending cheek is pivoted upward by the desired bending angle, whereby the part of the workpiece in front of the clamping means is bent up at the bending zone. Simultaneously the next bending zone is formed by the heater blades again being made to rest against that part of the workpiece. After termination of bending, the clamping means and holder are released again and the workpiece is advanced as far as the stop strip, so that the heated bending zone comes to rest against the front edge of the bending cheek. Another bending procedure follows. Depending on the bending angle a cross-sectionally polygonal, preferably square pipe segment can be formed.

A further development of this machine is described in the German patent 36 37 436. In this bending machine the clamping means is displaceable in and opposite the direction of advance of the workpiece. It no longer serves only to lock in place by means of the bending cheek the workpiece during bending but also now assumes the holder function of the previously known bending machine, namely the locking in place of the workpiece while the bending zone is formed by the heater. For that purpose the clamping means when open is displaceable from a position near the bending cheek into a position away from the bending cheek as seen in relation to the bending zone and is moved into the clamping position. After the bending zone has been formed, the clamping means is displaced again toward the bending cheek and in the process carries the workpiece with the heated bending zone as far as the bending cheek. In this bending machine the holder merely meets the function of locking the workpiece when the clamping means is moved to the deactivated state, that is the open state, away from the bending cheek. In view of this design of the bending machine, it is possible by means of suitable controls to fully automate bending so that upon insertion of the workpiece and following setting the distances between two bending zones, further intervention shall not be required. In a special design of this bending machine, the heater is mounted on the clamping means, whereby both are always displaced jointly.

These known bending machines are only suited to bend workpieces consisting purely of a thermoplastic. Recently however thermoplastic composites have assumed increasing significance. These are especially glass-, carbon- or aramid-fiber reinforced thermoplastics, both with short fibers and with filaments. In the latter case the fibers may be present in random form as matting or as fiber strands or bands processed into fabrics or superposed, crossing filaments. In particular as regards more recent plastics with high processing temperatures, for instance PEEK (polyetheresterketone), PPS (polyphenylene sulfide) or PEI (polyetherimide), fiber reinforcement is frequently used to produce plastics parts of high strength, with applications foremost in the aircraft industry. In these materials the thermoplastic forms the matrix for the fiber reinforcement. The fiber reinforcement is imbedded—especially as regards the above cited materials—with heating and high pressure, this pressure being applied either in a mold or by means of rolls.

Moreover sandwich panels with thermoplastic cover layers and an inserted support core are also known as thermoplastic composites.

Substantial problems arise when such thermoplastic composites are subjected to bending. Where fiber-reinforced thermoplastics are concerned, bending is opposed by the fibers being unable to change their length. Accordingly when bending takes place, there takes place delamination at the outside of the bending zone, that is the bond between the plastic matrix and the fibers is lifted, or fibers will rupture. On the inside the fibers are upset and then project from the matrix material. Either condition entails an appreciable loss of strength in the bending zone of the workpiece. All attempts at palliation so far have led to unsatisfactory results or else entailed excessive expense.

SUMMARY OF THE INVENTION

The object of the invention is to discover a bending method whereby the workpieces made of a thermoplastic composite can be bent without loss of strength or only a slight one. Another object of the invention is to provide as appropriate as possible bending equipment to implement this method.

Regarding the bending of fiber-reinforced thermoplastics, the method of the invention is solved in that the workpiece is heated at least from the future inside of the bending zone and only therein, and in that this workpiece shall be bent around a bending beam resting against the inside and in that the bending zone shall be subjected to compression transverse to the workpiece surface. Preferably the heat shall be applied also during bending.

In the invention, therefore, the fiber-reinforced thermoplastic workpiece is heated from the inside of the bending zone and following sufficient heating is bent around a bending beam. It is essential that at the latest after the bending process, the bending zone shall be subjected to compression approximately such as was used when making the workpiece itself. The above combination of method steps reverses any delamination and compresses the fibers anew, so that the workpiece strength in the bending zone is not degraded at all or hardly. For the first time a method is now available that allows bending a fiber-reinforced thermoplastic without substantial losses in strength.

As regards the bending of a thermoplastic sandwich material, a modification of the above method is provided, whereby the workpiece is heated at least from the future inside of the bending zone and only in the bending zone, whereupon the workpiece is bent around a bending beam abutting its inside and heat is also applied during bending. This modification takes into account that sandwich materials almost always are substantially thicker than fiber-reinforced thermoplastics and that accordingly it is essential to continue applying heat during bending. In view of the workpiece thickness it is recommended that it shall be heated not only from the inside of the bending zone but also from the outside. Additionally it may be advantageous to subject the bending zone during and/or directly after bending to a compression transverse to the workpiece surface. This is especially advantageous when the cover layers are fiber-reinforced because thereby delamination is opposed.

The heating of the bending zone should be to the welding temperature and thereby to a temperature a few tens K below the decomposition temperature of the thermoplastic, i.e. of the matrix material.

When using a bending beam with a plane rest surface, heating should be carried out essentially in the absence of compression. As regards a bending beam with a curved contact surface, heating should be accompanied by a compression high enough that the bending beam shall penetrate the cover layer of the workpiece without however warping it.

It is possible to bend only one workpiece segment adjacent to the bending zone around the bending beam and to hold the other segment in place. More advantageously however both workpiece segments adjacent to the bending zone shall be bent by the same angle around the bending beam held stationary.

Also, the compression of the bending zone already may begin during bending. Preferably the compression however only starts after bending and appropriately from the outside toward the bending beam using a compression beam which can be made to rest over an area. A pressure of at least 0.2 N.mm$^2$ shall be applied. Appropriately the compression lasts at least five seconds. When using fiber-reinforced, thermoplastic workpieces, the compression shall be between five and thirty seconds, whereas when using sandwich workpieces, it shall be between twenty and fifty seconds. Care must be taken to avoid compression so strong and so long that the bending beam would enter the material and/or would expel material laterally.

The invention further provides that the bending zone shall be again heated from the inside between bending and compression and that this heating should be to a temperature a few tens of K below the decomposition temperature of the plastic.

The problem of the equipment of the invention is solved by a bending machine with the following features when this bending machine is called on to bend a fiber-reinforced thermoplastic, (a) the bending machine comprises a machine frame, (b) the machine frame comprises a workpiece rest defining a rest plane (c) a bending beam is mounted in the machine frame, (d) a drive system is provided to generate such relative motion between the bending beam and the workpiece rest that the bending beam and the workpiece can be moved toward each other in the bending zone and so that at least one of the workpiece segments adjacent to the bending zone can be pivoted about the bending beam, (e) a compression rest is mounted opposite the bending beam, (f) a heater is provided to heat the bending zone of the workpiece.

This bending machine is characterized by a simple design but nevertheless allows the inherently difficult bending of fiber-reinforced, thermoplastic workpieces. Advantageously, the bending beam is in the form a heater blade with integrated heater means, whereby simple design is possible.

Where the bending machine is used for processing thermoplastic sandwich materials, its design should be as follows:

(a) the bending machine 1 comprises a machine frame 2, (b) the machine frame 2 comprises a workpiece rest 20 defining a rest plane, (c) a bending beam 16, 49 is mounted in the machine frame 2, (d) the bending beam 16, 49 is a heater blade to heat the bending zone of the workpiece 52, 53, (e) a drive system 10, 36, 37 is provided to generate such relative motion between the bending-beam 16, 49 and the workpiece rest 20 that the bending beam 16, 49 and the workpiece 52, 53 can be moved relative to each other in the bending zone and so that at least one segment of the workpiece 52, 53 adjacent to the bending zone can be pivoted around the bending beam 16, 49.

Because the bending beam in this case is a heater blade, heat shall be reliably applied also during bending and thereby the entire cross-section of the sandwich material remains heated. Even more uniform temperature distribution during bending is assured when a heating means to heat the bending zone from outside the workpiece is present opposite the bending beam, whereby heating takes place from both sides.

Usefully a compression rest is mounted opposite the bending beam to allow compression transversely to the workpiece surface. This compression rest may be combined with the above mentioned heater system.

In another feature of the invention, the compression rest is a compression beam which can be applied in the direction of the bending beam. Accordingly the compression beam can be actively moved toward the bending beam. The compression rest should be fitted with an elastic, for instance elastomeric compression surface facing the bending beam. Preferably the compression surface should match the shape of the bending-zone outside, i.e., its surface should be concave.

The relative motion between the workpiece rest and the bending beam, and thereby the bending process, may be generated in a number of ways. Illustratively the workpiece rest may be mounted in stationary manner in the machine frame and the bending beam may be movable in such a way as to move between two rest segments of the workpiece rest and through the rest plane and in this manner bends the workpiece. However the kinematically reverse design has been found appropriate, whereby the workpiece rest comprises two rest-segments extending on both sides together with the compression rest, said rest segments being each pivotable toward the bending beam in the operational position. In this case the bending beam is stationary at least after having been set on the workpiece and the workpiece segments are bent by pivoting the rest segments about the bending beam. Obviously it is possible also to move both the bending beam and the rest segments during bending.

The invention provides furthermore for the workpiece rest being vertically displaceable to its rest plane relative to the pivot axis. In this manner the pivoting geometry of the two rest segments can be matched to the particular workpiece thickness in such manner that the actual rotation of the workpiece segments essentially takes place about an axis inside the workpiece.

The rest segments appropriately are rest plates to provide a two-dimensional rest for the workpiece. The rest segments should have a common pivot axis preferably located in the workpiece surface in order to prevent relative motion between the rest segments and the workpiece during bending.

Especially advantageously, the bending beam is designed to be a heater blade with an integrated heating system. Such a heater blade illustratively is known from the German Gebrauchsmuster 85 36 431.2. The combination of bending beam and heater blade simplifies extraordinarily the actual construction of the bending machine and besides assures adequate heat to the workpiece during bending.

The bending beam may be supported so as to be displaceable perpendicularly to the rest plane. However it possible also to allow the workpiece rest to be displaceable toward the bending beam in order to make the workpiece abut said beam.

It was found that the bending beam appropriately comprises a preferably plane rest surface bounded by bending edges when fiber-reinforced thermoplastic plates or laminations are being bent—in other words, the contact surface lacks roundness. This offers the advantage that the range of fiber motion is clearly limited by the bending edges and the intermediate space can penetrate the inside of the bending zone, i.e. can find an open space there. Also the appearance of the bending zone is especially advantageous when such feature is present.

However the bending beam also may comprise a curved inside contact surface matching the desired inside bending radius. When sandwich materials are bent, the bending beam then may enter the cover layer and thereby enlarge the contact zone. Virtually no losses in strength are then incurred when bending fiber-reinforced thermoplastics.

It is clear per se that the bending of a workpiece as described above can be fully automated with a corresponding control system so controlling the motions of the bending beam, of the rest segments and/or of the compression beam, also in time, that optimal bending shall ensue depending on the particular kind of workpiece.

BRIEF DESCRIPTION OF THE DRAWINGS

The invention is elucidated by an illustrative embodiment shown in the drawing.

DESCRIPTION OF THE PREFERRED EMBODIMENTS

Figure 1:
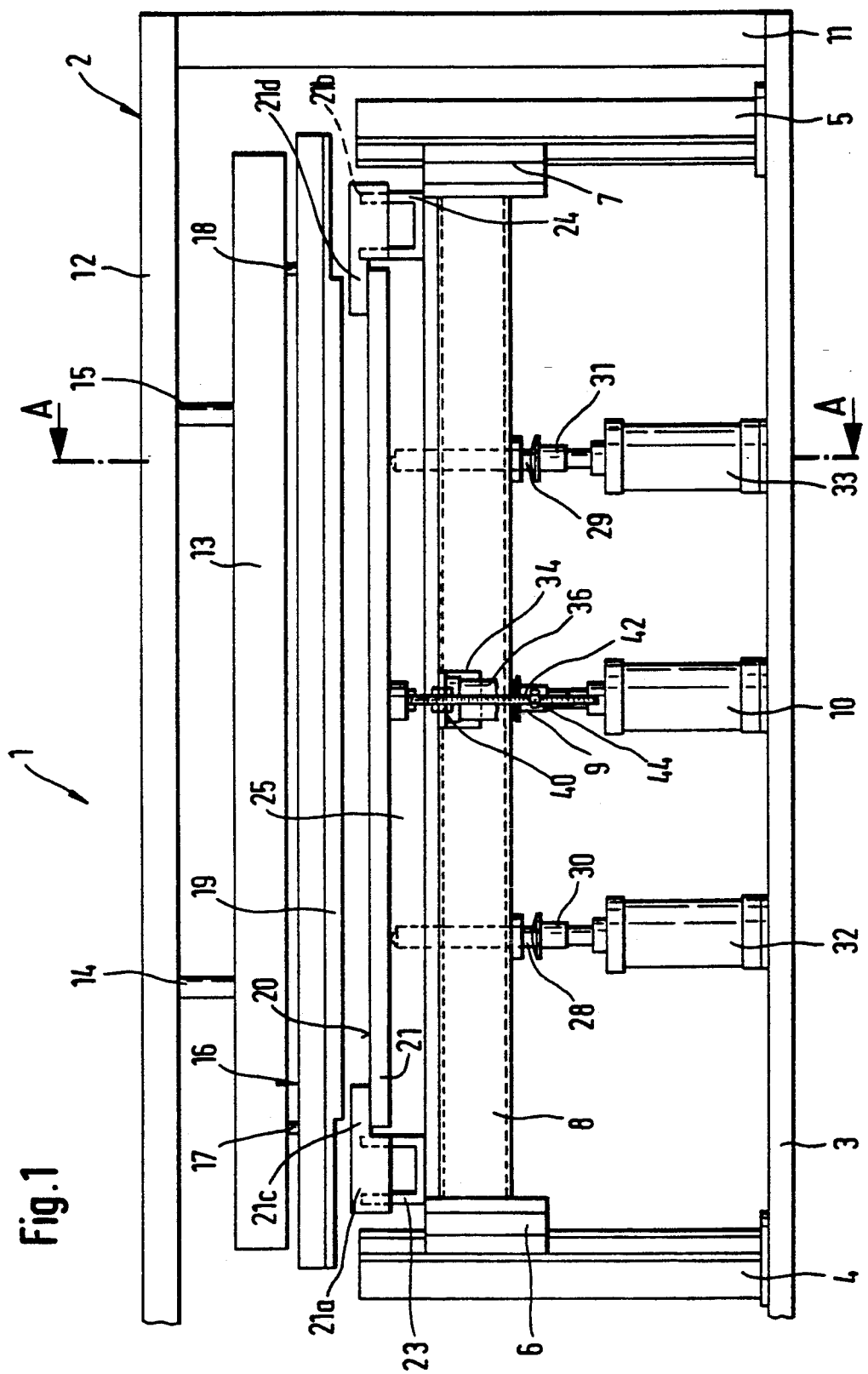
FIG. 1 is a front view of the bending machine of the invention.
Figure 2:
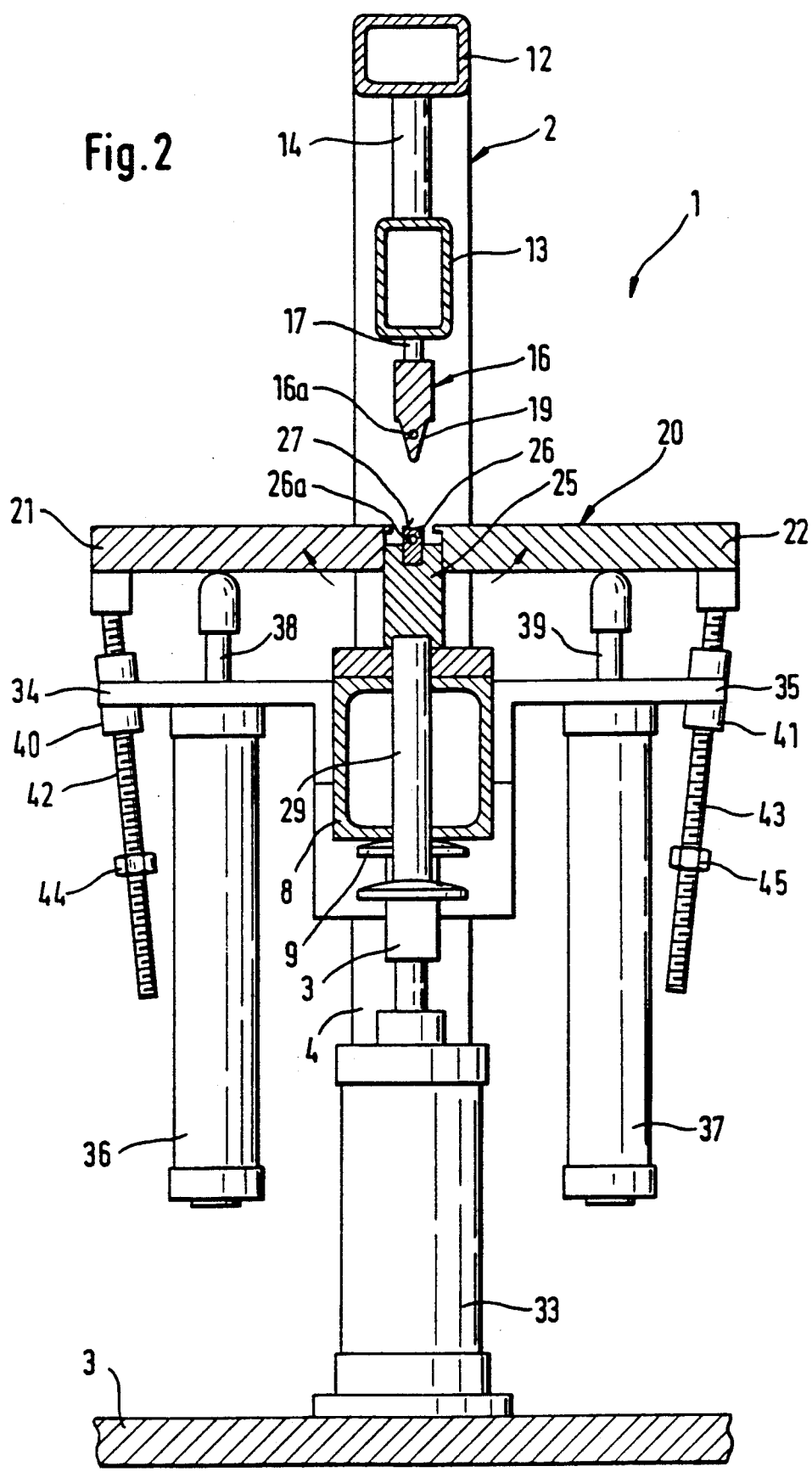
FIG. 2 is a cross-section of the bending machine of FIG. 1 in the plane A—A.

The bending machine 1 shown in FIGS. 1 and 2 comprises a machine frame 2 standing on a base plate. The machine frame 2 comprises two lateral posts 4, 5. Two carriages 6, 7 are supported in vertically displaceable manner by the posts 4, 5. A cross-beam 8 extending horizontally between the posts 4, 5 and resting at its center by means of a compression plunger 9 of a compression cylinder 10 standing on the base plate 3 is affixed to the two carriages 6, 7. By suitably pressurizing the cylinder 10, the crossbeam 8 guided by the carriages 6, 7 can be displaced vertically.

Two further posts 11 are mounted to the outsides of each post 4, 5, of which the left-hand post is omitted for lack of space. These posts 11 carry a connecting and yoking beam 12. A holding beam 13 and holding bars 14, 15 are suspended from this yoking beam 12. The holding beam 13 therefore is vertically displaceable relative to the yoking beam 12. A bending beam 16 is suspended from the lower side of the holding beam 13. This bending beam 16 is joined by two holding bolts 17, 18 to the holding beam 13.

The bending beam 16 extends parallel to the crossbeam 8, the yoking beam 12 and the holding beam 13. The bending beam 16 comprises a downward tapering bending segment 19. The bending beam 16 at the same time forms a heater blade such as are illustratively known from the German Gebrauchsmuster 85 36 431.2. In it are located therefore heater elements 16a with which temperatures up to 400° C. can be produced at the outside of the bending segment 19.

A workpiece rest 20 is present below the bending beam 16 and consists of two rest plates 21, 22. The rest plates 21, 22 when in their base position extend horizontally and define a rest plane for a workpiece to be bent. Pivot levers 21a, 21b each perpendicular to the plane of the drawing of FIG. 1 are affixed to the end faces of these contact surfaces, namely to the underside of mutually facing projections 21c, 21d of the pivot levers 21a, 21b. The screw fastening means only indicated in dash-dot lines are such that the vertical spacing between the projections 21c, 21d and the rest plates 21, 22 can be adjusted.

The pivot levers 21a, 21b each are supported in a bearing block 23, 24 so they may be swung upward. By means of the above described adjustability, the rest plane defined by the rest plates 21, 22 can be set a suitable distance from the pivot axis defined by the bearing blocks 23, 24 and preferably in such manner that the pivot axis is located in the top side of a workpiece to be bent. Besides, this pivot axis extends precisely parallel underneath the bending beam 16.

A compression beam 25 extends between the two rest plates 21, 22, parallel to and directly underneath the bending beam 16. This compression beam 25 is provided with a compression strip 26 located in an upward open groove and made of a suitable material and with a concave compression surface 27 of which the lateral edges are located in the rest plane, said compression surface 27 being opposite the bending segment 19 of the bending beam 16. Again heater elements 26a are mounted in the compression strip to heat it.

In its normal position, the compression beam 25 rests by its underside on the top side of the crossbeam 8. Two compression-transmission bolts 28, 29 pass through the crossbeam 8. These bolts are guided in vertically displaceable manner in said crossbeam and by their lower end faces press against vertically displaceable compression punches 30, 31 of compression cylinders 32, 33 which are symmetrical relative to the center of the crossbeam 8 and rise in spaced manner from its center from the base plate 3. Due to the pressure-loading by the compression cylinders 32, 33, the compression plungers 30, 31 and hence the compression beam 25 together with the rubber strip 26 can be moved vertically toward the bending beam 16.

Angle-brackets 34, 35 overhanging on each side are affixed to the center of the crossbeam 8. One compression cylinder 36, 37 is mounted to the horizontally overhanging parts of these angle-brackets 34, 35 and the compression rods 38, 39 of said cylinders pass through said angle-brackets and can be displaced upward. They touch by their top-side ends the superposed rest plate 21 and 22 resp.

Guide-sleeves 40, 41 rest on the outer ends of the angle-brackets 34, 35 and can pivot about horizontal axes and are crossed by threaded rods 42, 43. The threaded rods 42, 43 also are pivotably suspended from the rest plates 21, 22 in the vicinity of the particular outer edges. Stop nuts 44, 45 adjustably screwed-on from below limit the pivot angle of the rest plates 21, 22 when stopped by the lower end faces of the guide sleeves 40, 41.

Basically a lamellar workpiece will be bent by the bending machine 1 as follows.

First the workpiece is placed on the workpiece rest in such a way that the future bending zone is located precisely above the compression strip 26 of the compression beam 25, i.e. below the bending beam 16. The bending machine 1 in this process assumes the base position shown in FIGS. 1 and 2. The bending beam 16 is at a temperature a few tens of K below the temperature of decomposition of the workpiece plastic. Where a fiber-reinforced thermoplastic sandwich is being processed, the compression strip 26 shall be raised to the same temperature.

Thereupon the crossbeam 8 is moved upward by the compression plunger 9 moving out of the compression cylinder 10. Said crossbeam in the process carries along and upward the compression beam 25 and the rest plates 21, 22 by means of the bearing blocks 23, 24 together with the rest provided by the compression cylinders 36, 37, the rest plates 21, 22 remaining horizontal. The vertical motion ceases when the workpiece shall touch by its upper-side bending zone the bending segment 19 of the bending beam 16. The workpiece shall be heated at the future inside in the bending zone because touching the bending beam 16.

Depending on the shape of the bending segment and the bending beam, heating essentially takes place in the absence of pressure or else at a specific pressure. In the example shown in FIGS. 1 through 3, the bending beam 16 comprises a bending segment 19 with a horizontal and two-dimensional contact surface 46 bounded by lateral longitudinal edges 47, 48. As regards this bending beam 16, a pressure merely of 0.5 to 2 bars is produced to assure complete contact between the bending beam 16 and the workpiece and to compensate for any lack of evenness.

Figure 4:
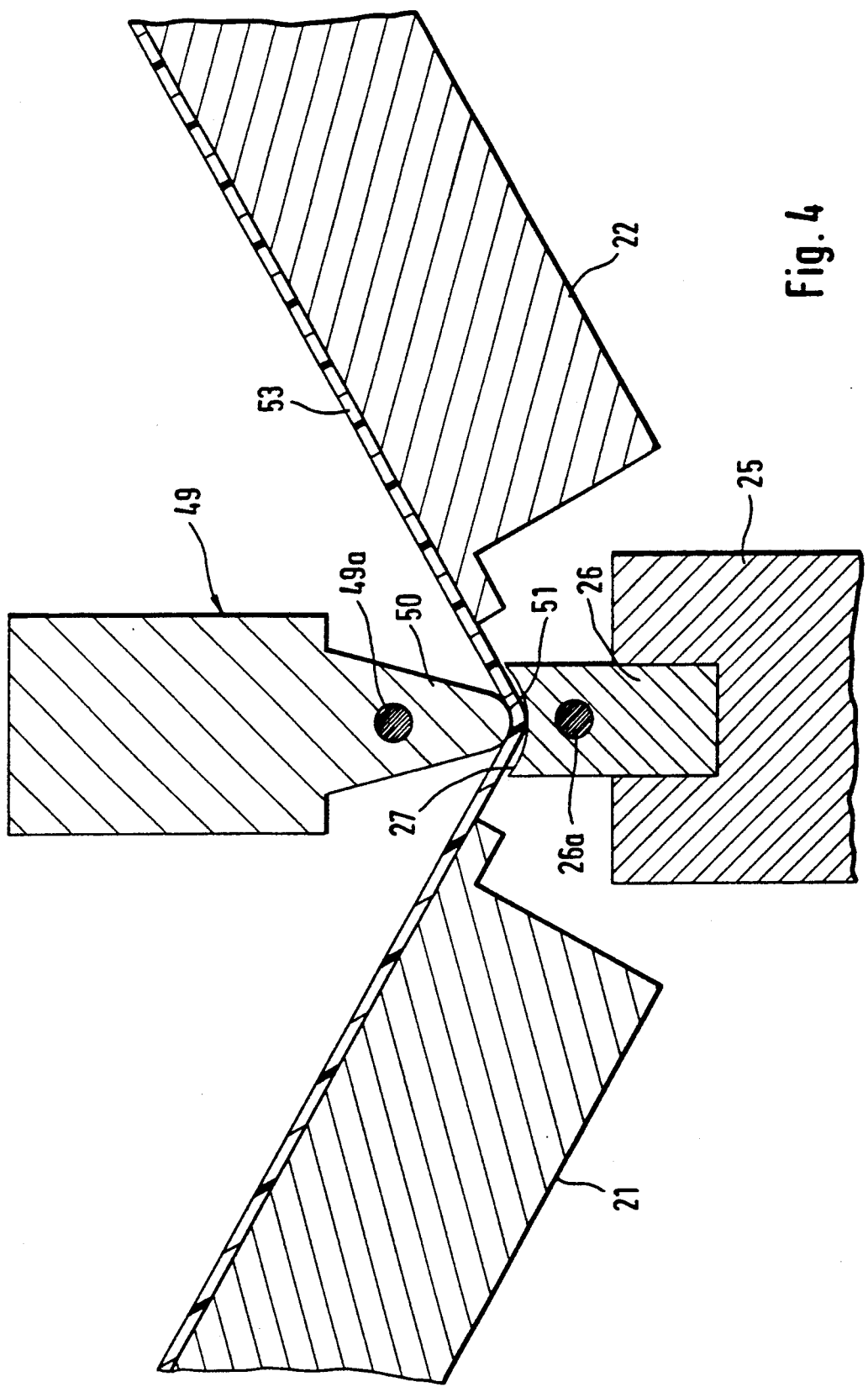
FIG. 4 is an enlargement of part of the machine of FIGS. 1 and 2 when bending a workpiece with a curved bending beam.

The illustrative embodiment shown in FIG. 4 comprises a somewhat differently shaped bending beam 49 with heater elements 49a and of which the bending segment 50 evinces a curved contact surface 51 corresponding to the future inner bending radius. Because initially the workpiece contact is merely linear for this bending beam 49, the workpiece is forced at some pressure against the bending beam 49 by further upward motion of the crossbeam 8. As a result, the bending segment 50 slightly penetrates the workpiece and at once the contact zone is appreciably increased.

Figure 3:
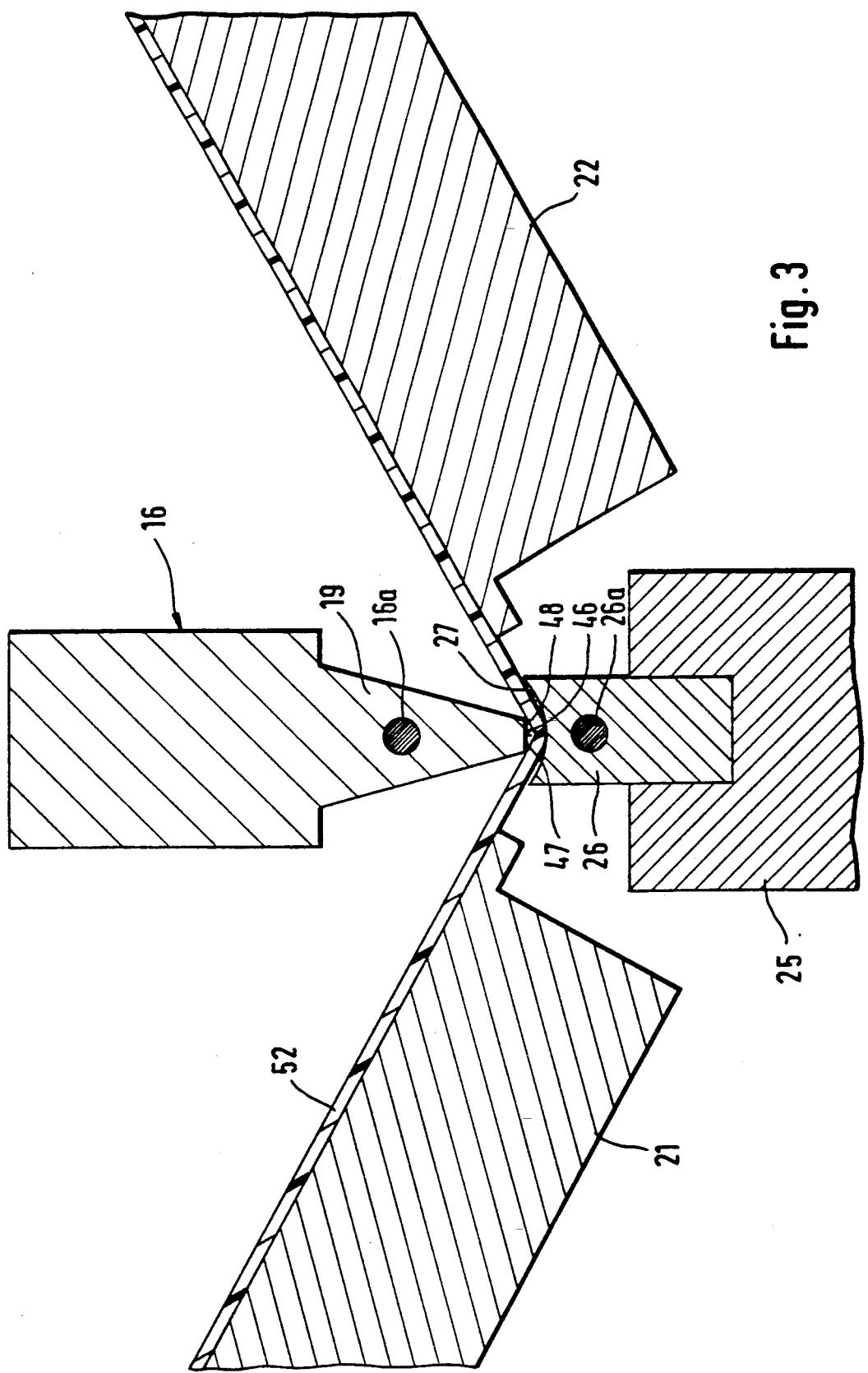
FIG. 3 is an enlargement of part of the bending machine of FIGS. 1 and 2 when bending a workpiece by means of a bending beam with plane contact surfaces.

After the workpieces denoted by 50, 51 in FIGS. 3 and 4 have been raised to the welding temperature in the bending zones, bending begins. For that purpose the compression cylinders 36, 37 are so pressurized that the compression rods 38, 39 now extend. The rest plates 21, 22 pivot relative to each other and around the bending beam 16 and 49 resp. The pivoting motions are limited by coming to rest against stop nuts 44, 45 on the guide sleeves 40, 41. These positions are shown in FIGS. 3 and 4.

In the embodiment of the bending beam 16 shown in FIG. 3, a restriction is placed by the longitudinal edges 47, 48 on the range of fiber displacement. The lamellar material enters the free space between the inside bending zone and the rest surface 46, but this process is not shown in further detail in FIG. 3. The width of the contact surface 46 is computed in such manner that there is enough volume to accommodate the plastic matrix entering the free space which shall be filled.

After bending, the compression beam 25 is forced toward the bending beam 16, 49 by activating the compression cylinders 32, 33. The compression plungers 30, 31 move upward and again make contact with the compression-transmitting bolts 28, 29 which they force upward and thereby also the compression beam 25. As a result this compression strip 26 makes contact with the outside of the bending zone of the workpiece 52, 53. When sandwich material is being bent, the compression beam 25 already makes contact with the workpiece 52, 53 before bending in order to heat the workpiece 52, 53 from both sides.

The compression applied following bending and its duration of application depend on the material of the workpiece 52, 53. On one hand the compression shall be as high as possible in order to reverse the delamination taking place at the outside of fiber-reinforced composites. On the other hand the bending beam 16, 49 may not unduly penetrate the workpiece 52, 53 or force the material to the side whereby the thickness of the workpiece 52, 53 would decrease in the bending zone. Depending on the material, pressures of 15 to 40 bars were found suitable. The compression not only provides an increase in strength, but also smoothes the workpiece surface, the appearance being especially advantageous for a bending beam 16 as shown in FIG. 3.

As regards the embodiment of FIG. 3, appropriately a short delay shall be introduced between bending and compressing in order to further heat the bending zone as far as its outer range. An especially smooth surface shall be achieved thereby.

Following compression, the compression cylinders 32, 33 and the compression cylinder 10 are moved down into their initial positions. The rest plates 21, 22 still remain in the positions shown in FIGS. 3 or 4. The inside of the bending zone is moved away from the bending segment 19, 50 whereby the workpiece 52, 53 can cool to below the glass temperature. Thereupon the workpiece 52, 53 can be removed from the bending machine 1.

The bending procedure is further elucidated below by means of Examples and in relation to its time sequence.

EXAMPLE 1

A workpiece 52 consisting of a fiber-reinforced composite, namely a polyetherimide plastic matrix with five-ply glass mats therein is inserted into a bending machine 1 with the bending beam 6. The sequence is as follows:

| Phase | Time (min) | Procedure |
|---|---|---|
| 1 | 0:00–0:35 | The workpiece 52 is forced against the bending beam 16 at a pressure between 0.05 and 0.2 N/mm$^2$ |
| 2 | 0:35–0:45 | The workpiece 52 is bent by pivoting the rest plate 21, 22 by the specified angle |
| 3 | 0:45–0:50 | The bending zone is heated further in essentially compression-free manner |
| 4 | 0:50–0:55 | Compression of the bending zone by raising the compression beam 25 at a pressure of 3 N/mm$^2$ |
| 5 | 0:55–1:15 | Lowering the crossbeam 8 and cooling in the bending machine 1. |

EXAMPLE 2

A sandwich material with cover layers of glass-fiber mat reinforced phenolformaldehyde is bent in the bending machine 1 with the bending beam 16. The sequence is as follows:

| phase | time | procedure |
|---|---|---|
| 1 | 0:00–2:45 | Heating the bending zone by contact with the bending beam 49 at a pressure of 0.2 N/mm$^2$ and by contact with the compression strip 26 |
| 2 | 2:45–2:55 | Bending the workpiece by pivoting the rest plates 21, 22 by the specified angle |
| 3 | 2:55–3:30 | Compression of the bending zone by pressing the compression beam 25 at a pressure of 0.6 N/mm$^2$ |
| 4 | 3:30–4:00 | Descent of the crossbeam 8 and cooling in the bending machine 1. |

I claim:

1. Machine for bending reinforced thermoplastic workpieces, comprising:
  a) a machine frame;
  b) first and second spaced rest plates mounted to said frame, said plates having a first planar orientation, defining a rest plane, for supporting a workpiece and a second angularly disposed orientation for bending the workpiece;
  c) a compression rest disposed between said plates;
  d) a heated bending beam in alignment with and spaced from said compression rest;
  e) a drive system operably associated with said frame for causing relative movement between said beam and said plates and said rest so that a workpiece supported by said plates and said rest in said first orientation may engage said beam;
  f) means operably interconnecting said plates for defining therefor a common pivot axis;
  g) means operably associated with said plates for causing at least one of said plates to be pivoted about said axis; and
  h) means operably associated with said plates when in said first planar orientation for adjusting said plates relative to said common pivot axis so that said rest plane may be selectively positioned relative to said common pivot axis prior to a workpiece on said plates being engaged by said bending beam.

2. The machine of claim 1, wherein:
  a) said bending beam has a heater blade.

3. The machine of claim 2, wherein:
  a) said blade has a planar contact surface.

4. The machine of claim 2, wherein:
  a) said blade has an arcuate contact surface.

5. The machine of claim 1, wherein:
  a) said rest includes a heater.

6. The machine of claim 5, wherein:
  a) said rest has a concave contact surface for the workpiece.

7. The machine of claim 5, wherein:
  a) said rest includes a compression strip supporting the workpiece.

8. The machine of claim 7, wherein:
  a) said strip is formed of rubber.

9. The machine of claim 1, wherein:
  a) said drive system is operably connected to said plates and said rest for causing cooperating movement thereof relative to said beam.

10. The machine of claim 9, wherein:
  a) said drive system includes a pressurizable cylinder and piston assembly.

11. The machine of claim 10, wherein:
  a) a compression beam is mounted within said frame, and said plates and said rest are operably connected to said compression beam; and
  b) said cylinder and piston assembly is operably connected to said compression beam so that operation thereof causes movement of said compression beam and thereby of said plates and said rest.

12. The machine of claim 1, wherein:
  a) said common axis is located in the plane defined by said plates when in said first orientation.

13. The machine of claim 1, wherein:
  a) each of said plates has spaced side edges; and
  b) said interconnecting means operably interconnects said plates at each of said edges.

14. The machine of claim 13, wherein:

a) said interconnecting means includes a pivot lever connected to said of said plates at each of said side edges; and b) means are operably associated with said levers for causing movement thereof relative to the associated plates for thereby setting said common axis relative to the workpiece.

15. The machine of claim 1, wherein:

a) said causing means includes a cylinder and piston assembly operably connected to each of said plates.

16. The machine of claim 11, wherein:

a) first and second outwardly projecting brackets are connected to said beam, each of said brackets is operably associated with one of said plates; and b) said causing means includes a cylinder and piston assembly for each of said plates, each of said cylinder and piston assemblies is operably associated with one of said brackets and has an extensible portion thereof engaged with the associated plate for causing pivoting thereof.

17. The machine of claim 16, wherein:

a) limit means extended from each of said brackets and are connected to each of said plates for limiting pivoting thereof.

18. The machine of claim 17, wherein each limit means includes:

a) a guide sleeve pivotally supported by an associated one of said brackets;

b) a threaded rod having a first end connected to an associated one of said plates and an opposite end carrying a nut; and c) each rod passing through the associated sleeve so that engagement of the nut with the sleeve prevents further movement thereof and thereby of the associated plate.

19. A machine for bending thermoplastic composites, comprising:

a) a machine frame;

b) a workpiece rest comprising first and second spaced plates, said plates having a first planar horizontal orientation defining a rest plane;

c) a heater blade mounted to said frame and spaced vertically relative to said plates when in said first orientation;

d) a compression rest disposed between said plates in alignment with said blade;

e) drive means operably associated with said frame for causing relative movement between said plates when in said first orientation and said blade so that a workpiece supported by said plates may engage said blade;

f) said plates pivotal about a common pivot axis;

g) said drive means adapted for pivoting at least one of said plates relative to said axis for thereby causing a workpiece engaged with said blade to be bent to a predetermined angular orientation; and h) means operably associated with said plates for, when in said first orientation, adjusting said plates vertically relative to said common pivot axis so that said rest plane may be selectively positioned relative to said common pivot axis prior to a workpiece resting upon said plates being engaged by said blade.

20. The machine of claim 19, further comprising:

a) means operably associated with each of said plates for setting said axis relative to the workpiece.

* * * * *